(12) United States Patent
Ohta

(10) Patent No.: US 7,800,593 B2
(45) Date of Patent: Sep. 21, 2010

(54) STORAGE MEDIUM STORING POINTING DEVICE INPUT ADJUSTMENT PROGRAM, INPUT ADJUSTMENT APPARATUS AND INPUT ADJUSTMENT METHOD

(75) Inventor: Keizo Ohta, Kyoto (JP)

(73) Assignee: Nintendo Co., Ltd., Kyoto-shi (JP)

( * ) Notice: Subject to any disclaimer, the term of this patent is extended or adjusted under 35 U.S.C. 154(b) by 1153 days.

(21) Appl. No.: 11/408,069

(22) Filed: Apr. 21, 2006

(65) Prior Publication Data

US 2007/0008298 A1   Jan. 11, 2007

(30) Foreign Application Priority Data

Jul. 8, 2005   (JP) .............................. 2005-200618

(51) Int. Cl.
*G06F 3/041* (2006.01)
*G06K 11/06* (2006.01)
*G08C 21/00* (2006.01)

(52) U.S. Cl. .................. 345/173; 178/18.01; 178/18.02
(58) Field of Classification Search ......... 345/173–178; 178/18.01–20.04
See application file for complete search history.

(56) References Cited

U.S. PATENT DOCUMENTS 5,777,605 A    7/1998   Yoshinobu et al.
5,861,874 A *  1/1999   Joto ............................ 345/173
6,359,616 B1   3/2002   Ogura et al.
6,727,892 B1   4/2004   Murphy
7,283,127 B2 * 10/2007  Taylor et al. ................. 345/173
2001/0024195 A1* 9/2001 Hayakawa .................... 345/173

FOREIGN PATENT DOCUMENTS

EP   0 987 649   3/2000
JP   6-161646    6/1994

* cited by examiner

*Primary Examiner*—Alexander Eisen
*Assistant Examiner*—Cory A Almeida
(74) *Attorney, Agent, or Firm*—Nixon & Vanderhye P.C.

(57) ABSTRACT

A computer as an input adjustment apparatus includes a memory. This memory stores an input adjustment program. The computer is connected with a touch pad. When a user touches the touch pad with his/her finger, the computer is provided with touch coordinate data on a touched portion and a value according to an area of the touched portion. Based on the coordinate data and the value according to the touch area, the computer calculates a scale factor of a range in which the user can actually perform an operation in such a manner as to conform to a whole operating range of the touch pad. Then, the computer multiplies by the scale factor a difference of coordinates indicated by the coordinate data (current touch coordinates) from a reference position, and input the resulting value as input data into an electronic device.

9 Claims, 12 Drawing Sheets

(A) WHOLE OPERATING RANGE OF TOUCH PAD (B) ACTUAL OPERABLE RANGE OF TOUCH PAD (SHADED AREA)

(A) IN CASE WHERE TOUCH POSITION IS ON RIGHT OF REFERENCE POSITION (B) IN CASE WHERE TOUCH POSITION IS ON LEFT OF REFERENCE POSITION (A) IN CASE WHERE TOUCH POSITION IS ABOVE REFERENCE POSITION (B) IN CASE WHERE TOUCH POSITION IS BELOW REFERENCE POSITION (A) THIN FINGER (AREA OF TOUCHED PORTION: SMALL)

(B) THICK FINGER (AREA OF TOUCHED PORTION: LARGE)

(A) THIN FINGER (AREA OF TOUCHED PORTION: SMALL)

(B) THICK FINGER (AREA OF TOUCHED PORTION: LARGE)

(A) WHOLE OPERATING RANGE OF TOUCH PAD (B) OPERABLE RANGE I (TOUCHED PORTION: SMALL)

(C) OPERABLE RANGE II (TOUCHED PORTION: LARGE)

STORAGE MEDIUM STORING POINTING DEVICE INPUT ADJUSTMENT PROGRAM, INPUT ADJUSTMENT APPARATUS AND INPUT ADJUSTMENT METHOD

CROSS REFERENCE OF RELATED APPLICATION

The disclosure of Japanese Patent Application No. 2005-200618 is incorporated herein by reference.

BACKGROUND

1. Field

Example embodiments of the present invention relate to a storage medium storing pointing device input adjustment program, an input adjustment apparatus and an input adjustment method. More specifically, example embodiments of the present invention relate to a storage medium storing pointing device input adjustment program, an input adjustment apparatus and an input adjustment method, which adjust an input signal from a pointing device such as a touch pad.

2. Description of the Related Art

One example of related art is disclosed in Japanese Patent Laying-open No. 6-161646 [G06F 3/03, G06F 3/033] (document 1) laid-open on Jun. 10, 1994. According to document 1, when the user touches the operating surface of the touch panel with his/her finger, the touch panel outputs a signal of coordinates of a touch position. Also, when the user moves the finger over the touch panel without lifting it off the operating surface, the amount of movement of the coordinate signal output from the touch panel is calculated. This allows the movement of the cursor to be controlled.

Another example of related art is disclosed in the brochure of WO1/027868 internationally publicized on Apr. 19, 2001 (document 2). According to document 2, for example, a capacitance-type transparent touch pad is provided on the display of an LCD or CRT screen in such a manner as to perform an operation while watching the display.

Meanwhile, when its operating surface is touched with his/her finger, the capacitance-type touch pad (touch panel) or the like outputs a coordinate signal corresponding to the touch position and a value corresponding to the touch area (e.g. capacitance value). At that time, the size of a portion in which the finger touches the operating surface may vary according to a difference in finger thickness or a difference in the finger's touching force (pressure) or the like, which would cause an absolute or relative difference in a range covered by the coordinates of the touch position.

For example, as shown in FIG. 10(A) and FIG. 10(B), assume that a user having thin fingers and a user having thick fingers drag (slide) their fingers over the operating surface of the same touch pad. As illustrated in FIG. 10(A), when the user with thin (small) fingers drags his/her finger linearly from left and to right end on the touch pad, the horizontal touch coordinate of the finger (X coordinate) changes from a position shown by P1 to a position shown by P2. At that time, the length of dragging is indicated by a distance L1. On the other hand, when the user with thick (large) fingers drags his/her finger linearly from left end to right end on the operating surface, the X touch coordinate moves from a position shown by P3 to a position shown by P4. Here, the length of dragging is indicated by a distance L2.

Besides, a frame is provided on an outer periphery of the touch pad, and the user stops dragging near the outer circumference of the operating surface because the movement of the finger is restricted by the frame or he/she feels the frame by the finger.

As can be well understood from FIG. 10(A) and FIG. 10(B), a distance capable of being dragged varies depending on finger thickness, etc. (L1>L2). This is because there is a difference in size of a portion touched by the finger on the operating surface between the user with thin fingers and the user with thick fingers, as shown in FIG. 11(A) as a cross-sectional view of FIG. 10(A) taken at a line XIA-XIA and FIG. 11(B) as a cross-sectional view of FIG. 10(B) taken at a line XIB-XIB. Moreover, the size of the touch area may vary depending on not only finger thickness (size) but also an operating manner (pressure, etc.). Thus, the size of the touched portion (operable range) may be different among individual users (relative difference) and also may be different in the one and same user (absolute difference). In addition, FIG. 11(A) and FIG. 11(B) provide the size of the touched portion shown by the horizontal length of the touched portion as seen from the side (along the horizontal direction) for the sake of simplicity.

As apparent from FIG. 11(A) and FIG. 11(B), it is possible to drag (touch) the finger to a position closer to the end (edge) of the touch pad as the area of a portion touched by the finger becomes smaller. Conversely, it is hard to touch a place near the end of the touch pad as the area of a portion touched by the finger becomes larger. Therefore, in the case where the whole operating range of the touch pad is the one as shown in FIG. 12(A), the user can operate the shaded range in FIG. 12(B) (operable range I) if the touched portion is smaller in size, and the user can operate the shaded range in FIG. 12(C) (operable range II) if the touched portion is larger in size, for example. That is, this causes a problem in which the operable range varies depending on user's individuality or varies according to each occasion of operation performed even by the same user.

In consequence, using the touch pad in place of the joystick controller of a game machine, for example, would produce variations in controlling the player character's moving range and moving speed due to differences in touch operation-capable range.

SUMMARY

Therefore, it is one aspect of example embodiments of the present invention to provide a novel storage medium storing pointing device input adjustment program, input adjustment apparatus, and input adjustment method.

It is another aspect of example embodiments of the present invention to provide a storage medium storing a pointing device input adjustment program, an input adjustment apparatus, and an input adjustment method, which allow stable input operations regardless of a user's individuality and operating manner.

For resolution of the above mentioned problems, example embodiments of the present invention employ such a structure described below. The reference numerals and supplementary explanations, etc. in parentheses here indicate merely one example of correspondence with the embodiments described later for aid of understanding of example embodiments of the present invention, and imposes no limitations on the present invention.

A storage medium storing an input adjustment program for a pointing device according to one example embodiment of the present invention stores an input adjustment program for a flat-type pointing device that has an operating surface and inputs touch coordinates on the operating surface and a value according to a touch area at a moment when a touch operation is performed. This input adjustment program allows a computer to execute a correction value calculation step, a first range calculation step, a scale factor calculation step, and a distance correction step. In the correction value calculation step, on an assumption the value according to the touch area input from the flat-type pointing device indicates an area of a perfect circle, a correction value is calculated according to a radius of the perfect circle where the touch area is assumed to be the perfect circle area. In the first range calculation step, a first range capable of being covered by the touch coordinates at a time of an actual operation is calculated using the correction value calculated in the correction value calculation step. In the scale factor calculation step, a scale factor for conforming the first range calculated in the first range calculation step to a second range of the whole operating surface is calculated. In the distance correction step, a distance from a reference point to current touch coordinates is corrected by the scale factor calculated in the scale factor calculation step.

More specifically, the input adjustment program for a flat-type pointing device is executed by the computer (12). The flat-type pointing device (14) has an operating surface and, when the user touches the operating surface, inputs touch coordinates of a touch position and a value according to a touch area of a touched portion on the operating surface. That is, the device (14) provides them to the computer (12). Here, the value according to the touch area means a numerical value that increases or decreases with an increase or decrease in the touch area. For example, in the case of an electrostatic touch pad, the value indicates an electrostatic capacity increasing or decreasing according to the touch are. The input adjustment program allows the computer (12) to execute a correction value calculation step (S7), a first range calculation step (S23), a scale factor calculation step (S25), and a distance correction step (S27). In the correction value calculation step (S7), on an assumption that the value according to the touch area input from the flat-type pointing device (14) indicates the area of a perfect circle, a correction value is calculated according to the radius of the perfect circle where the touch area is assumed to be the area of the perfect circle. Here, the correction value according to the radius means a numerical value varying with length of radius of the circle, and equates to a value of radius of the circle or a value of square root of area of the circle, for example. In the first range calculation step (S23), the first range except a portion that cannot be operated by the user's finger is calculated using the correction value calculated in the correction value calculation step. In the scale factor calculation step (S25), a scale factor for conforming the first range calculated in the first range calculation step (S23) to the second range of the whole operating surface is calculated. In the distance correction step (S27), the distance from the reference point to the current touch coordinates (movement amount) is corrected by the scale factor calculated in the scale factor calculation step (S25).

According to example embodiments of the present invention, the distance from the reference point to the current touch coordinates is corrected by the scale factor for the actual operable range to the whole operating range of the touch pad, which makes it possible to perform stable input operations regardless of user's individuality and touching manner.

In an aspect of example embodiments of the present invention, the reference point indicates touch coordinates at a moment when the operating surface is touched, and the computer is further allowed to execute a reference point correction step of correcting at least one of a deviation in a horizontal direction and a deviation in a vertical direction of the reference point from a central point of the operating surface.

More specifically, the reference point indicates the touch coordinates at a moment when the user touches the operating surface. In the reference point correction step (S11, S13, S15, S17, S19 and S21), at least one of a deviation in the horizontal direction (X axis direction) and a deviation in the vertical direction (Y axis direction) of the reference point from the central point (original point) of the operating surface is corrected. This makes it possible to accommodate the deviation of the reference point and realize stable input operations.

Another storage medium storing an input adjustment program for a pointing device according to example embodiments of the present invention stores an input adjustment program for a flat-type pointing device that has an operating surface and inputs touch coordinates and a value according to a touch area at a moment when the operating surface is touched. This input adjustment program allows a computer to execute a correction value calculation step, a first range calculation step, a scale factor calculation step, and a coordinate correction step. In the correction value calculation step, on an assumption that a touch area input from the flat-type pointing device indicates an area of a perfect circle, a correction value is calculated according to a radius of the perfect circle using the value according to the touch area. In the first range calculation step, a first range in which the whole operating surface is reduced toward the center by a distance according to the correction value calculated in the correction value calculation step is calculated. In the scale factor calculation step, an enlargement ratio for conforming the first range calculated in the first range calculation step to the whole operating surface is calculated. In the coordinate correction step, by enlarging and correcting the touch coordinates in the first range at the enlargement ratio calculated in the scale factor calculation step, the touch coordinates in the first range is converted into touch coordinates in the whole operating surface.

More specifically, the input adjustment program for a flat-type pointing device is executed by the computer (12). The flat-type pointing device (14) has an operating surface and, when the user touches the operating surface, provides the computer (12) with touch coordinates of a touch position and a value according to a touch area of a touched portion on the operating surface. The input adjustment program allows the computer (12) to execute a correction value calculation step (S7), a first range calculation step (S23), a scale factor calculation step (S25), and a coordinate correction step (S28). In the correction value calculation step (S7), on an assumption that a touch area input from the flat-type pointing device is equal to the area of a perfect circle, a correction value is calculated according to the radius of the perfect circle using the value according to the touch area input from the flat-type pointing device (14). In the first range calculation step (S23), the first range in which the whole operating surface is reduced toward the center by a distance according to the correction value calculated in the correction value calculation step (S7) is calculated. In the scale factor calculation step (S25), a scale factor for conforming the first range calculated in the first range calculation step (S23) to the second range as the whole operating surface is calculated. In the coordinate correction step (S28), the touch coordinates in the first range is converted into touch coordinates in the second range (the whole operating surface) at the scale factor calculated in the scale factor calculation step (S25).

According to example embodiments of the present invention, the current touch coordinates are corrected by a scale factor for conforming the actual operable range to the whole operating range of the touch pad, it is possible to perform stable input operations regardless of user's individuality and touching manner.

An input adjustment apparatus according to example embodiments of the present invention is an input adjustment apparatus for a flat-type pointing device that has an operating surface and inputs touch coordinates and a value according to a touch area at a moment when the operating surface is touched. This input adjustment apparatus comprises a correction value calculation means, a first range calculation means, a scale factor calculation means, and a distance correction means. Assuming that the value according to the touch area input from the flat-type pointing device indicates an area of a perfect circle, the correction value calculation means calculates a correction value according to a radius of the perfect circle where the touch area is assumed to be the perfect circle area. The first range calculation means calculates a first range capable of being covered by the touch coordinates at a time of an actual operation using the correction value calculated by the correction value calculation means. The scale factor calculation means calculates a scale factor for conforming the first range calculated by the first range calculation means to a second range of the whole operating surface. The distance correction means corrects a distance from a reference point to current touch coordinates by the scale factor calculated by the scale factor calculation means.

As with the present invention of above described storage medium, this invention also allows stable input operations regardless of user's individuality and touch manner.

Another input adjustment apparatus according to the present invention is an input adjustment apparatus for a flat-type pointing device that has an operating surface and inputs touch coordinates and a value according to a touch area at a moment when the operating surface is touched. This input adjustment apparatus comprises a correction value calculation means, a first range calculation means, a scale factor calculation means, and a coordinate calculation means. Assuming that a touch area input from the flat-type pointing device indicates an area of a perfect circle, the correction value calculation means calculates a correction value according to a radius of the perfect circle using the value according to the touch area. The first range calculation means calculates a first range in which the whole operating surface is reduced toward the center by a distance according to the correction value calculated by the correction value calculation means. The scale factor calculation means calculates an enlargement ratio for conforming the first range calculated by the first range calculation means to a second range as the whole operating surface. The coordinate correction means, by enlarging and correcting the touch coordinates in the first range at the enlargement ratio calculated by the scale factor calculation means, converts the touch coordinates in the first range into touch coordinates in the second range.

As with example embodiments of the present invention of above described storage medium, example embodiments of invention also allow stable input operations regardless of user's individuality and touch manner.

Another input adjustment apparatus according to example embodiments of the present invention is an input adjustment apparatus for a flat-type pointing device that has an operating surface and inputs touch coordinates and a value according to a touch area at a moment when the operating surface is touched. This input adjustment apparatus comprises a correction value calculation means, a first range calculation means, a scale factor calculation means, and a coordinate calculation means. Assuming that a touch area input from the flat-type pointing device indicates an area of a perfect circle, the correction value calculation means calculates a correction value according to a radius of the perfect circle using the value according to the touch area. The first range calculation means calculates a first range in which the whole operating surface is reduced toward the center by a distance according to the correction value calculated by the correction value calculation means. The scale factor calculation means calculates an enlargement ratio for conforming the first range calculated by the first range calculation means to a second range as the whole operating surface. The coordinate correction means, by enlarging and correcting the touch coordinates in the first range at the enlargement ratio calculated by the scale factor calculation means, converts the touch coordinates in the first range into touch coordinates in the second range.

As with example embodiments of the present invention of above described storage medium, the example embodiments of this invention also allows stable input operations regardless of user's individuality and touching manner.

An input adjustment method according to example embodiments of the present invention is an input adjustment method for a flat-type pointing device that has an operating surface and inputs touch coordinates and a value according to a touch area at a moment when the operating surface is touched, including the following steps of: (a) on an assumption that the value according to the touch area input from the flat-type pointing device indicates an area of a perfect circle, calculating a correction value according to a radius of the perfect circle at a moment when the touch area is assumed to be the perfect circle area; (b) calculating a first range capable of being covered by the touch coordinates using the correction value calculated in the step (a); (c) calculating a scale factor for conforming the first range calculated in the step (b) to a second range as the whole operating surface; and (d) correcting a distance from a reference point to current touch coordinates by the scale factor calculated in the step (c).

As with the above described example embodiments of the present invention, example embodiments of this invention also allows stable input operations.

Another input adjustment method according to example embodiments of the present invention is an input adjustment method for a flat-type pointing device that has an operating surface and inputs touch coordinates and a value according to a touch area at a moment when the operating surface is touched, including following steps of: (a) on an assumption that a touch area input from the flat-type pointing device indicates an area of a perfect circle, calculating a correction value according to a radius of the perfect circle using the value according to the touch area; (b) calculating a first range in which the whole operating surface is reduced toward the center by a distance according to the correction value calculated in the step (a); (c) calculating an enlargement ratio for conforming the first range calculated in the step (b) to a second range as the whole operating surface; and (d) by enlarging and correcting the touch coordinates in the first range at the enlargement ratio calculated in the step (c), converting the touch coordinates in the first range into touch coordinates in the second range.

As with the above described example embodiments of the present invention, example embodiments of this invention also allow stable input operations.

The above described features, aspects and advantages of example embodiments of the present invention will become more apparent from the following detailed description of example embodiments of the present invention when taken in conjunction with the accompanying drawings.

DETAILED DESCRIPTION OF THE EXAMPLE EMBODIMENTS

Figure 1:
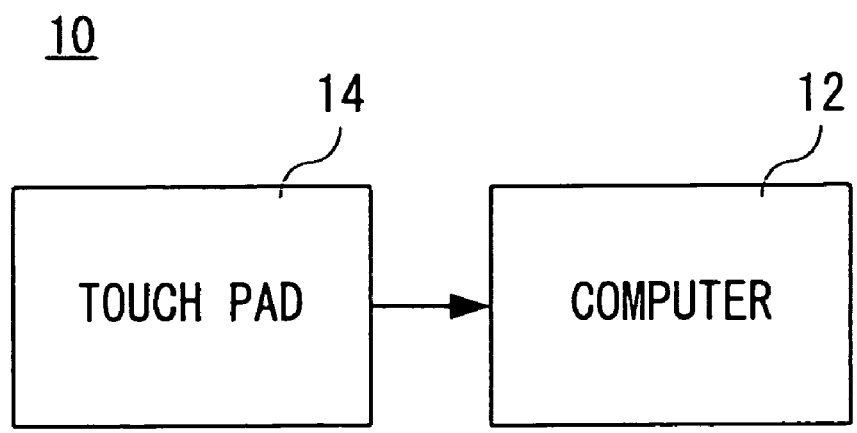
FIG. 1 is an illustrative view showing one example of structure of an input device of an example embodiment of the present invention.

Referring to FIG. 1, an input device 10 of one example embodiment of the present invention includes a computer 12. The computer 12 is connected with a touch pad 14. The computer 12 is typically a microcomputer and stores an input adjustment program for the touch pad 14 in a memory such as a ROM and serves as an input adjustment apparatus. The computer 12 is connected with an electronic device not illustrated. Applicable to the electronic device are personal computers, workstations, PDAs, game machines, and game machine controllers etc., for example. Alternatively, at least one of the computer 12 and the touch pad 14 may be included in the electronic device.

The touch pad (or touch panel) 14, when a user touches the pad surface as an operating surface with a finger, provides the computer 12 with touch coordinates corresponding to a position at a moment when the finger touches the pad surface and a value according to a touch area. Included as an example of touch coordinates is data on coordinates (coordinate data) at a barycenter of a portion in which the finger touches on the operating surface (touched position), for instance. Also, one example of the value according to the touch area is electrostatic capacity according to the area of the touched portion. These values are computed and output by an ASIC of the touch pad 14, etc. As the touch pad 14, for example, a touch pad made by Synaptics (http://www.synaptics.com/technology/cps.cfm) may be utilized. Besides, the above mentioned barycentric coordinate data and electrostatic capacity are mere examples. It is acceptable that the touch coordinates are coordinates defined by a touch position and that the value according to the touch area (the area of the touched portion) is a value that increases or decreases with an increase or decrease of the area of the touched portion. Therefore, the electrostatic touch pad can be replaced by any kind of touch pad (touch panel) including an optical type.

The computer 12 inputs input data in which the coordinate data and the electrostatic capacity provided from the touch pad 14 has been subjected to arithmetic operations (including adjustments), into the electronic device. Besides, the computer 12 may input the coordinate data and the electrostatic capacity directly into the electronic device. For example, a personal computer as the electronic device moves an arbitrary image such as a cursor (mouse pointer) and icon over the screen and scrolls through the screen, according to the input data. Moreover, a game machine as the electronic device controls the movement of a player character and the speed of the movement, according to the input data.

Figure 2:
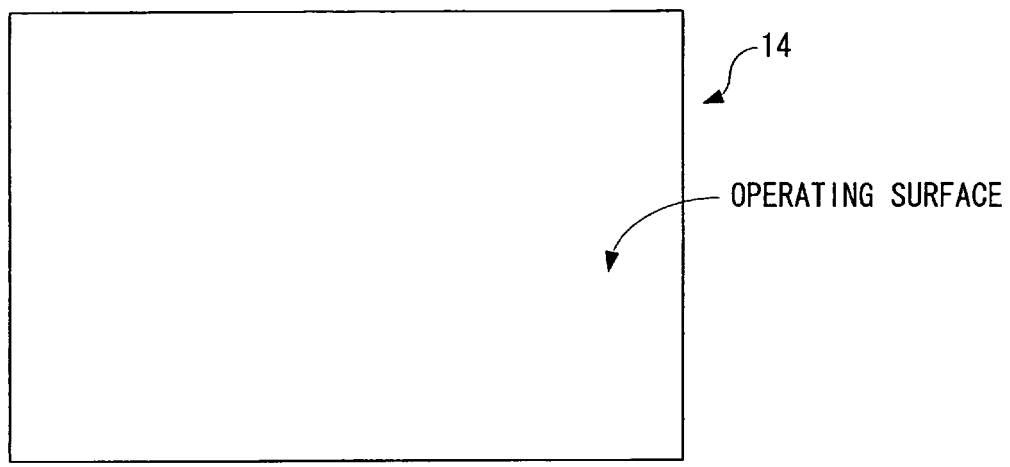
FIG. 2 is an illustrative view showing a whole operating range and an actual operable range of a surface of a touch pad shown in FIG. 1.
Figure 2:
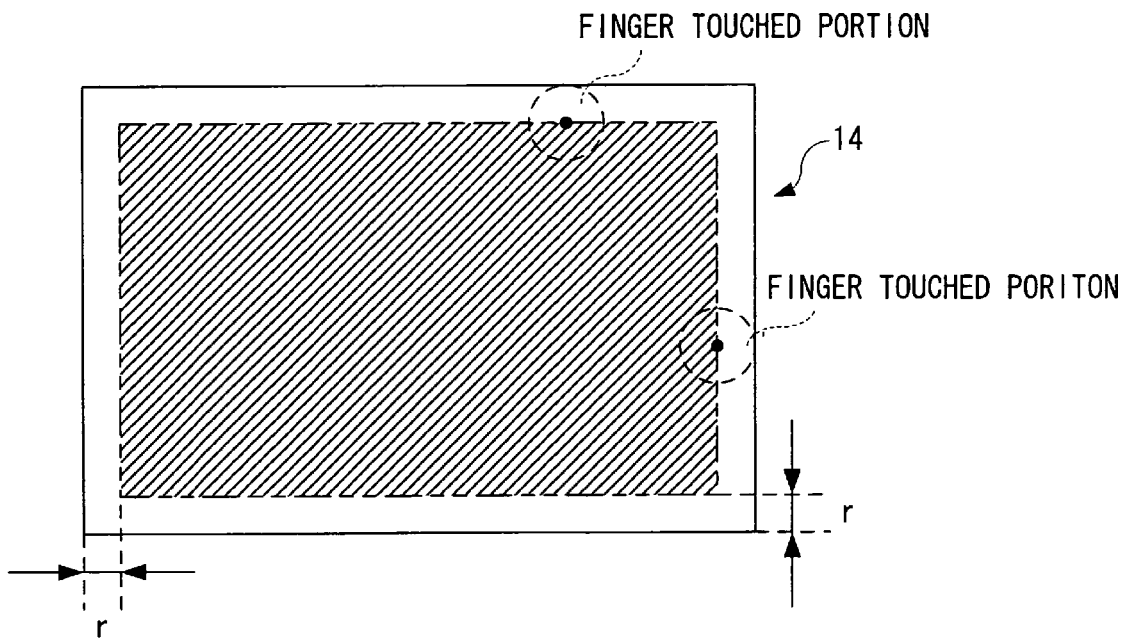

As shown in FIG. 2(A), in general, the whole surface of the touch pad 14 (pad surface) constitutes the operating surface (the whole operating range). However, in touching it with a finger, the surface of the touch pad 14 cannot be actually used up to an end (edge) as the operating range because the barycentric coordinate data of the portion touched with a finger is to be output. If a frame is provided around (on an outer periphery of) the touch pad 14, the user stops dragging near the outer periphery of the operating surface because the frame restricts the movement of the finger or he/she feels the frame by the finger. Accordingly, as shown in FIG. 2(B), a range capable of being dragging from side to side and up and down (operable range) is reduced by a length corresponding to a certain distance from the barycenter (center) of a portion touched with a finger (here, assuming that the touched portion has the form of a perfect circle, the length indicates a correction value r' according to a radius r of the perfect circle). In addition, the touched portion may vary in size relatively or absolutely depending on a user's individuality and touching manners, which would cause variations in actual operable range.

Consequently, in order to eliminate those variations in this embodiment, the actual operable range is corrected so as to conform to the whole operating range based on the size of the finger's touched portion. A detailed description will be provided below.

For example, the computer 12 stores touch coordinates at a moment when the user touches the touch pad 14 as a reference point, i.e., a reference position. After that, upon an input of touch coordinates by a dragging operation, the computer 12 determines a difference of the current touch coordinates from the reference position and inputs the amounts of movement of an X element and Y element into the electronic device (not shown). The reference position is fixed in this embodiment for the sake of simplicity, and alternatively, it may come closer to the center of the touch pad over time.

Figure 3:
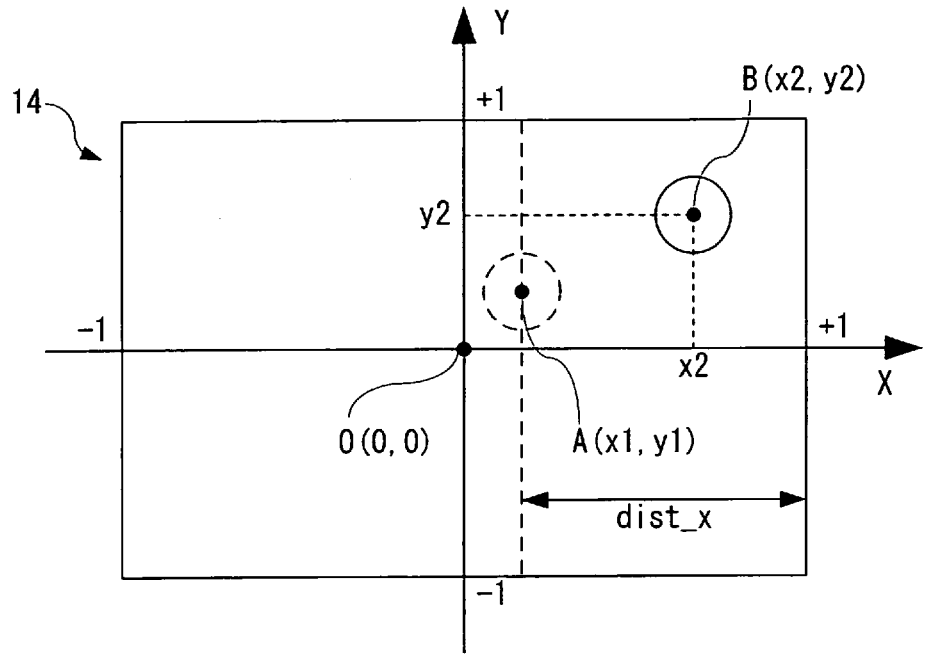
FIG. 3 is an illustrative view describing a maximum value in a horizontal direction in an operating field of the touch pad shown in FIG. 1.
Figure 3:
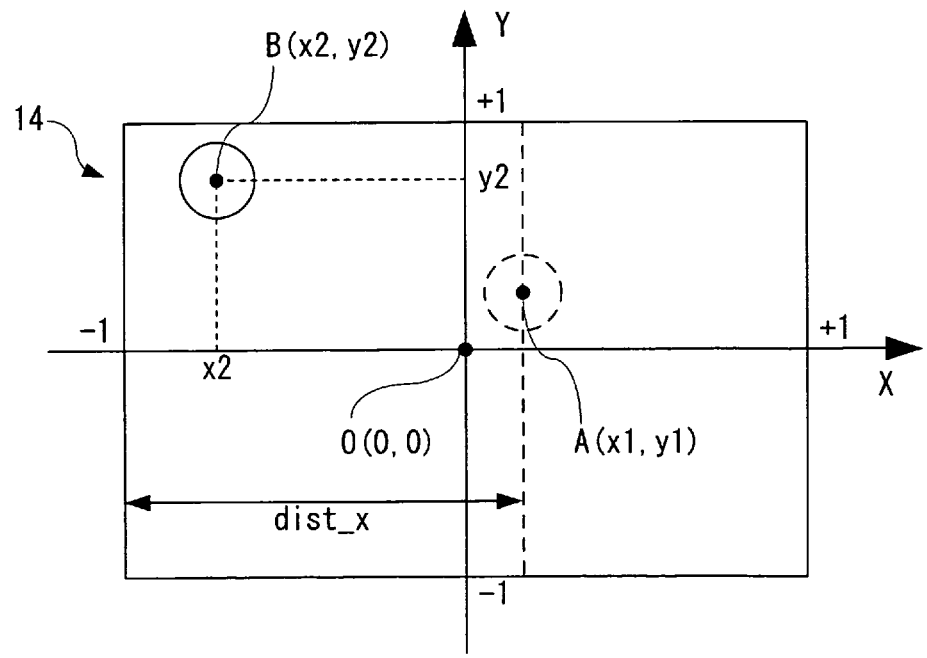
Figure 4:
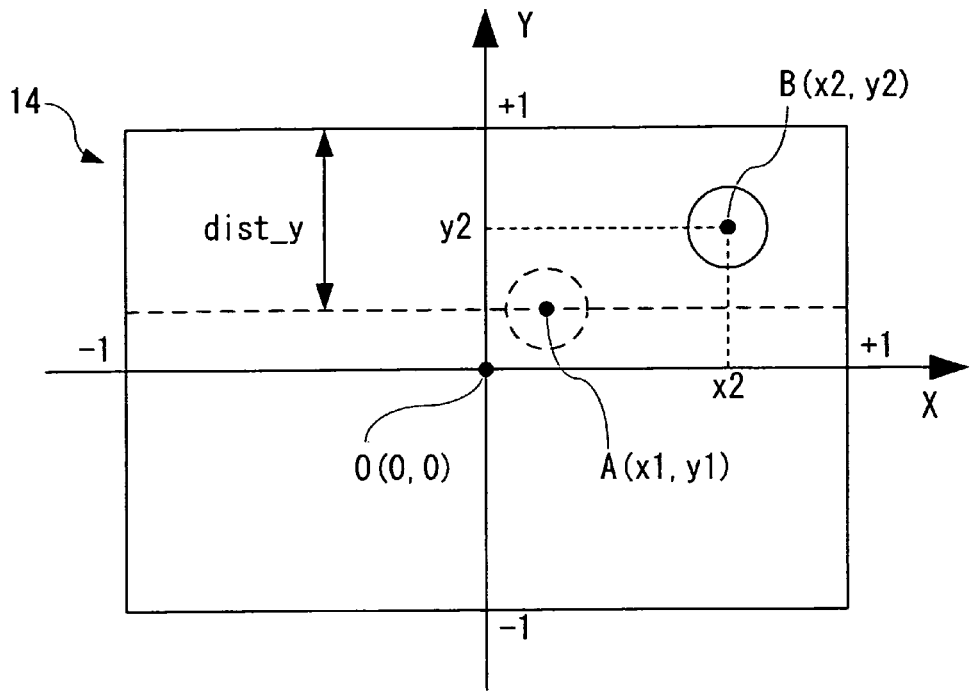
FIG. 4 is an illustrative view describing a maximum value in a vertical direction in the operating field of the touch pad shown in FIG. 1.
Figure 4:
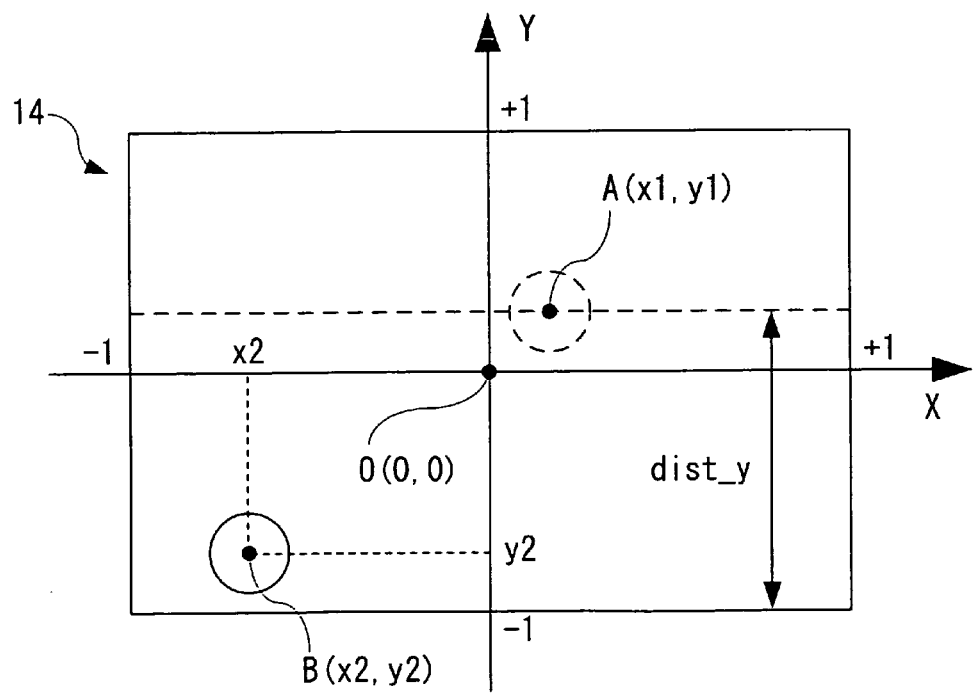

Also, the reference position may not match the center of the whole operating range of the touch pad 14, and thus a range (maximum value) in the horizontal direction (X axis direction) and a maximum value in the vertical direction (Y axis direction) which can be covered by the current touch coordinates are determined on the basis of a relationship between the touch coordinates and the reference position. In this embodiment, the maximum value in the X axis direction is expressed by a variable dist_x, and the maximum value in the Y axis direction is expressed by a variable dist_y. Both the variable dist_x and the variable dist_y must have absolute values. Moreover, in this embodiment, the touch pad 14 is divided into a first quadrant, a second quadrant, a third quadrant, and a fourth quadrant, taking its center as an origin point. The variables dist_x and dist_y are thus defined as appropriate in accordance with their relationships with the reference position. Furthermore, in FIG. 3 (also FIG. 4), circles of dotted lines show finger touch shapes (touched portions) on the touch coordinates at a time of touch, and circles of solid lines indicate finger touch shapes (touched portions) at current touch positions.

Firstly, as shown in FIG. 3(A), a current touch position B (x2, y2) is on the right of a reference position A (x1, y1), that is, if $x2 \geq x1$, the maximum value in the X axis direction, i.e., the variable dist_x is expressed by equation 1:

$$\text{dist}\_x = 1 - x1 \quad \text{[Equation 1]}$$

Also, as shown in FIG. 3(B), the current touch position B (x2, y2) in on the left of the reference position A (x1, y1), that is, if $x2 < x1$, the maximum value in the X axis direction, i.e., the variable dist_x is expressed by equation 2:

$$\text{dist}\_x = 1 + x1 \quad \text{[Equation 2]}$$

As indicated in FIG. 4(A), if the current touch position B (x2, y2) is above the reference position A (x1, y1), that is, if $y2 \geq y1$, the maximum value in the Y axis direction is expressed by equation 3:

$$\text{dist}\_y = 1 - y1 \quad \text{[Equation 3]}$$

In addition, as indicated in FIG. 4(B), if the current touch position B (x2, y2) is under the reference position A (x1, y1), that is, if $y2 < y1$, the maximum value in the Y axis direction is expressed by equation 4:

$$\text{dist}\_y = 1 + y1 \quad \text{[Equation 4]}$$

In this manner, the maximum values in the X axis direction and the Y axis direction are determined in accordance with the relative positional relationship between the reference position A and the current touch position B. Besides, as shown in FIG. 2(B), no operation can be virtually performed in an outer region of surface of the touch pad 14. Therefore, a length corresponding to this region is excluded (subtracted) from both the maximum value in the X axis direction and the maximum value in the Y axis direction.

More specifically, in order to simplify the equations and reduce calculation loads, based on the assumption that the finger touched portion has the shape of a perfect circle, the correction value r' according to the radius r of the perfect circle is determined according to equation 5, and then the actual maximum values (dist_x' and dist_y') in which this correction value r' is subtracted from the both maximum values in the X and Y directions as shown in equation 6.

Additionally, in equation 5, S denotes electrostatic capacity in the area of the touched portion and corresponds to the electrostatic capacity provided from the touch pad 14. Moreover, in the equation 5, k indicates a certain variable and is supposed to be decided by a programmer or designer of the input adjustment program or the input adjustment apparatus in this embodiment.

$$r' = k \times \sqrt{S} \quad \text{[Equation 5]}$$

$$\text{dist}\_x' = \text{dist}\_x - r'$$

$$\text{dist}\_y' = \text{dist}\_y - r' \quad \text{[Equation 6]}$$

Besides, in equation 5, the correction value r' is determined without using a proper formula for the radius of a circle ($r = \sqrt{(S/\pi)}$) for the purpose of reducing the calculation loads. Therefore, in the case of not taking the calculation loads into account, it is also possible to determine the radius r according to the formula and use the radius r in equation 6 instead of using the correction value r'.

Figure 5:
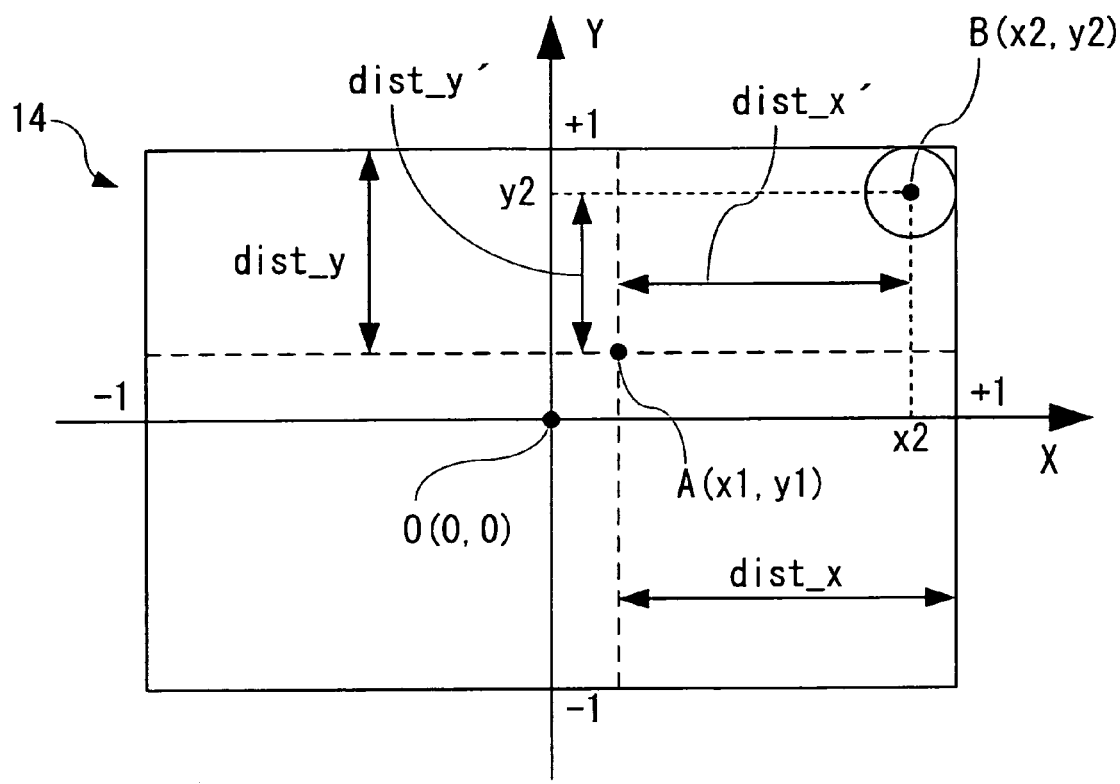
FIG. 5 is an illustrative view describing an actual maximum value in the operating field of the touch pad shown in FIG. 1.

Consequently, if the touch pad 14 is currently touched at its upper right portion and the touch position is on the right of the reference position and above the same, the actual maximum values (dist_x' and dist_y') are indicated as in FIG. 5.

Here, in order the actual maximum values (dist_x' and dist_y') to conform to the whole operating range of the touch pad 14 ($-1 \leq x \leq 1$, $-1 \leq y \leq 1$), their scale factors (scale_x, scale_y) are determined according to equation 7. That is, the scale factors (enlargement ratios) are calculated for conformity of the actual operable range to the whole operating range.

$$\text{scale}\_x = 1 \div \text{dist}\_x'$$

$$\text{scale}\_y = 1 \div \text{dist}\_y' \quad \text{[Equation 7]}$$

Accordingly, the actual data to be input to the electronic device (the data on amount of movement (distance)) is calculated according to equation 8:

$$X \text{ element in the input data} = (x2 - x1) \times \text{scale}\_x$$

$$Y \text{ element in the input data} = (y2 - y1) \times \text{scale}\_y \quad \text{[Equation 8]}$$

Figure 6:
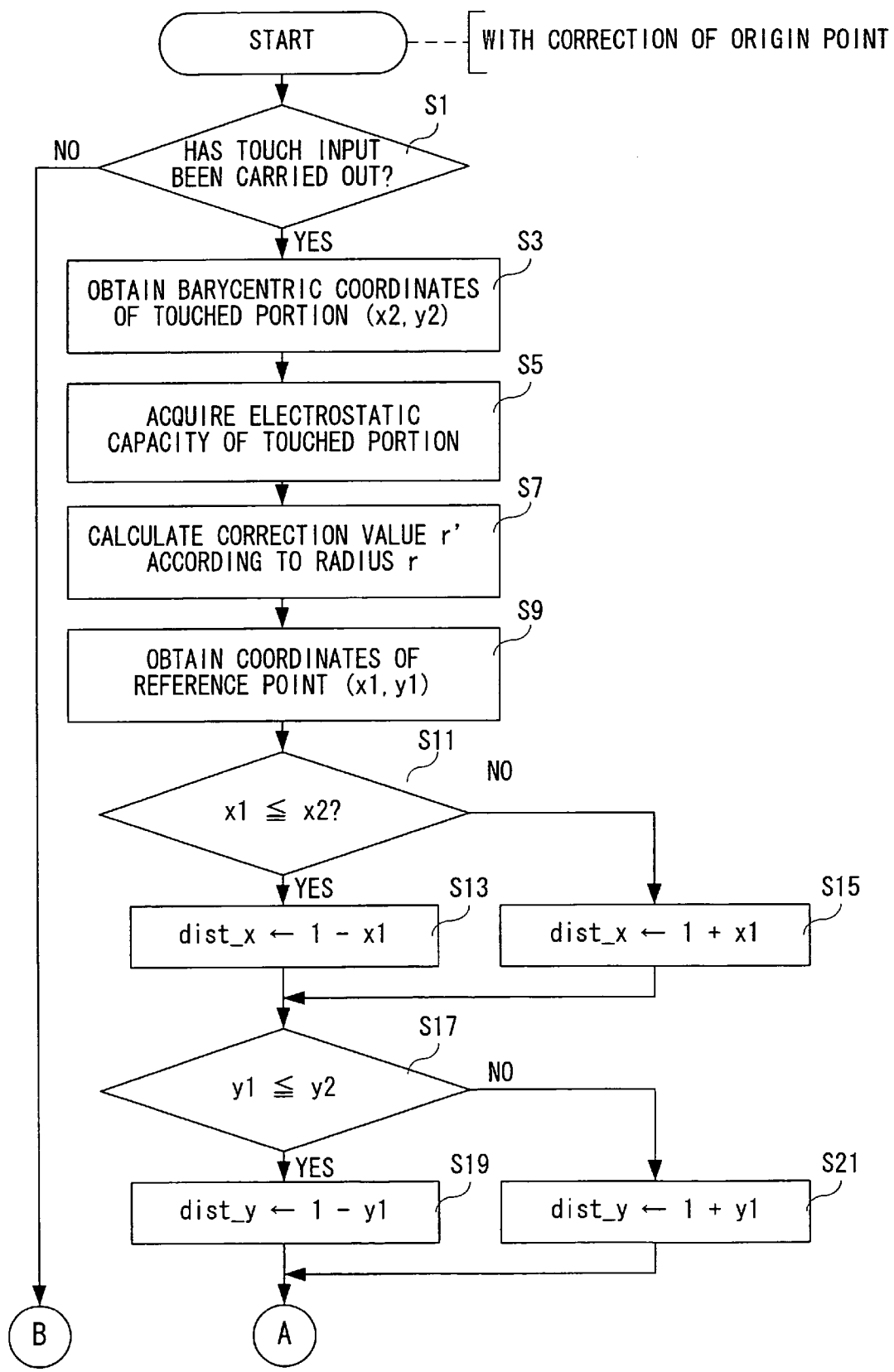
FIG. 6 is a flowchart showing a part of data input process of a computer shown in FIG. 1.
Figure 7:
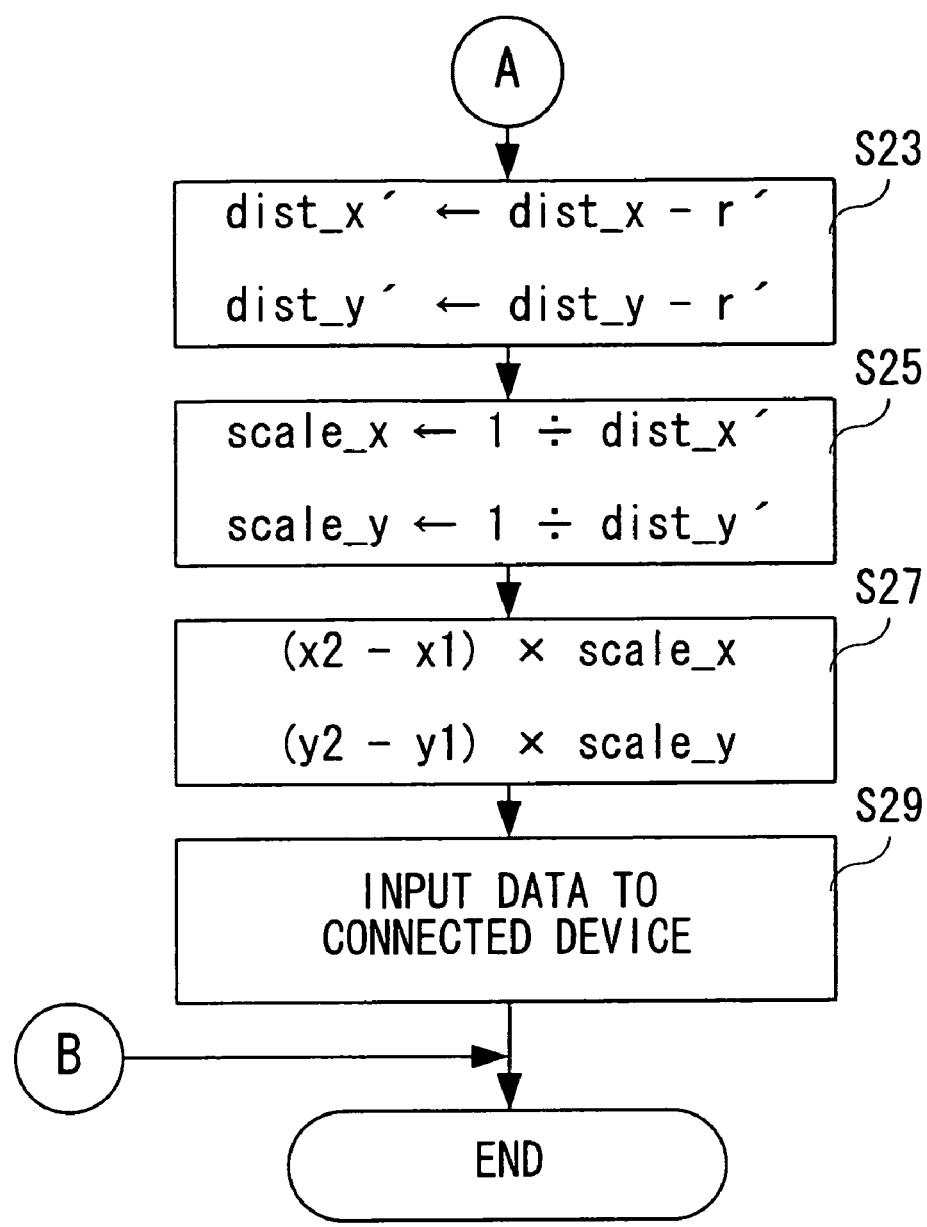
FIG. 7 is a flowchart showing another part of data input process of the computer shown in FIG. 1 and continuing from FIG. 6.

More specifically, the computer 12 of FIG. 1 executes a data input process in FIG. 6 and FIG. 7. Referring to FIG. 6, when starting the data input process, the computer 12 determines whether a touch input has been carried out or not in a step S1. To be more precise, it is determined whether coordinate data and area data have been provided or not from the touch pad 14. If "NO" in the step S1, that is, if no touch input has been carried out, the data input process is immediately terminated as shown in FIG. 7.

In contrast, if "YES" in the step S1, that is, if a touch input has been carried out, the barycentric coordinates of the touched portion, i.e., the current touch coordinates (x2, y2) are obtained in a step S3, and the electrostatic capacity S of the touched portion is acquired in a step S5. More specifically, the current coordinates (x2, y2) is obtained on the basis of the coordinate data provided from the touch panel 14 and the electrostatic capacity S is obtained on the basis of the electrostatic capacity provided from the touch pad 14.

In a succeeding step S7, assuming that the shape of the touched portion is a perfect circle (completely round), the correction value r' according to the radius r of the perfect circle is calculated on the basis of equation 5. In a next step S9, coordinates of the reference point (x1, y1) are obtained. The coordinates of the reference (x1, y1) are touch-on coordinates that, if "YES" in the first step S1, are obtained as coordinates (x2, y2) in the step S3.

Subsequently, it is determined in a step S11 whether $x1 \leq x2$ or not. That is, it is determined whether the x coordinate of the reference point falls below the x coordinate of the current touch coordinates. If "YES" in the step S11, that is if $x1 \leq x2$, a value $1 - x1$ is assigned to the variable dist_x in a step S13 and then the process moves to a step S17. On the other hand, if "NO" in the step S11, that is, if $x1 > x2$, the value $1 + x1$ is assigned to the variable dist_x in a step S15, and then the process moves to the step S17.

In the step S17, it is determined whether $y1 \leq y2$ or not. That is, it is determined whether or not the y coordinate of the reference point falls below the y coordinate of the current touch coordinates. If "YES" in the step S17, that is, if $y1 \leq y2$, the value $1 - y1$ is assigned to the variable dist_y in a step S19, and then the process goes to a step S23 of FIG. 7. On the other hand, if "NO" in the step S17, that is, if y1>y2, a value 1+y1 is assigned to the variable dist_y in a step S21, and then the process goes to the step S23.

The processes of steps S11 to S21 correct a deviation of the origin point from the reference point.

As shown in FIG. 7, a value dist_x−r' is assigned to the variable dist_x', and a value dist_y−r' is assigned to the variable dist_y' in the step S23. In a succeeding step S25, a value 1÷dist_x' is assigned to the variable scale_x, and a value 1÷dist_y' is assigned to the variable scale_y. That is, the enlargement ratios are calculated. Then, in a step S27, the input data is worked out. More specifically, the x element of the input data is calculated by an equation (x2−x1)×scale_x, and the y element of the input data is calculated by an equation (y2−y1)×scale_y. Then, the input data is input into the connected electronic device in a step S29, and the data input process is terminated.

The above mentioned data input process is executed at regular time intervals (e.g. one frame (1/60 second)).

According to this embodiment, an actual operable range is determined from the electrostatic capacity of the touched portion and then is adjusted so as to conform to the operable range of the touch pad. This eliminates relative and absolute differences in the operable range, making it possible to perform stable input operations.

Also, in this embodiment, since the actual operable range is adjusted so as to conform to the operable range of the touch pad each time a touch input is detected, it is possible to accommodate variations in the actual operable range of the touch pad by one dragging operation.

Figure 8:
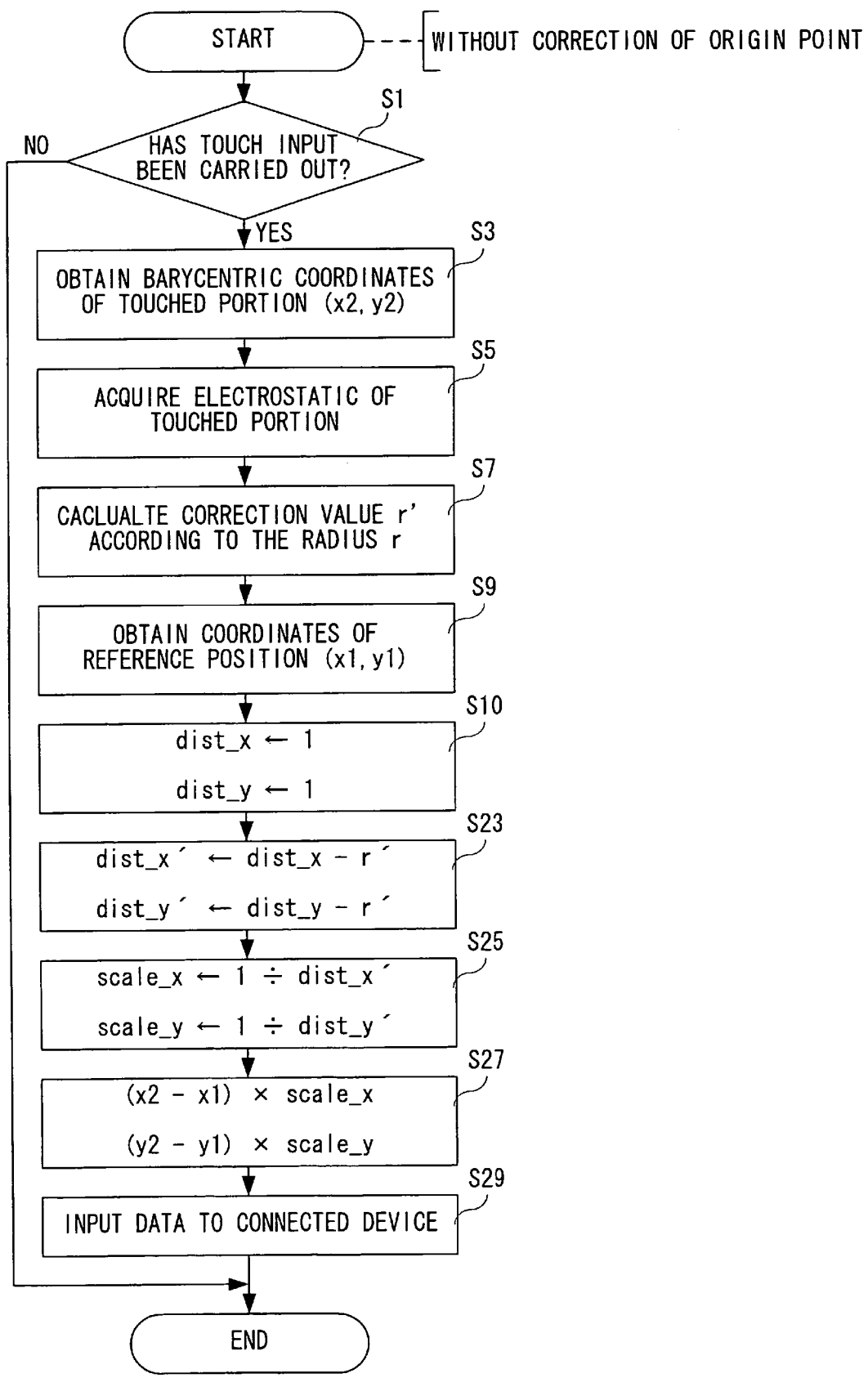
FIG. 8 is a flowchart showing another example of data input process of the computer shown in FIG. 1.

Besides, in the above described embodiment, as shown in FIG. 6 and FIG. 7, a deviation of the origin point from the reference point is corrected in the data input process. However, even if no deviation is corrected, it is possible to perform relatively stable input operations. In this case, such a data input process as shown in FIG. 8 is carried out. The data input process shown in FIG. 8 is the same as the data input process in FIG. 6 and FIG. 7 except that the steps S11 to S21 are deleted and that a step S10 is added between the step S9 and the step S23. In the step S10, "1" is assigned to both the variables dist_x and the variable dist_y.

In such a case, since the variables dist_x and dist_y have constants, it is also possible to omit the process of step S10 by assigning "1" to the both variables dist_x and dist_y.

Moreover, in the above mentioned embodiment, the position at which the user firstly touches is set as a reference point, and a distance between the reference point and the current touch position is corrected. Alternatively, the current touch position (touch coordinates) may be corrected regardless of the reference point. In this case, the origin point may be fixedly set as a central point of the operating surface or as one of vertexes of he operating surface. Relative touch coordinates may be simply detected with respect to the origin point, which eliminates the need for correcting the origin point.

Figure 9:
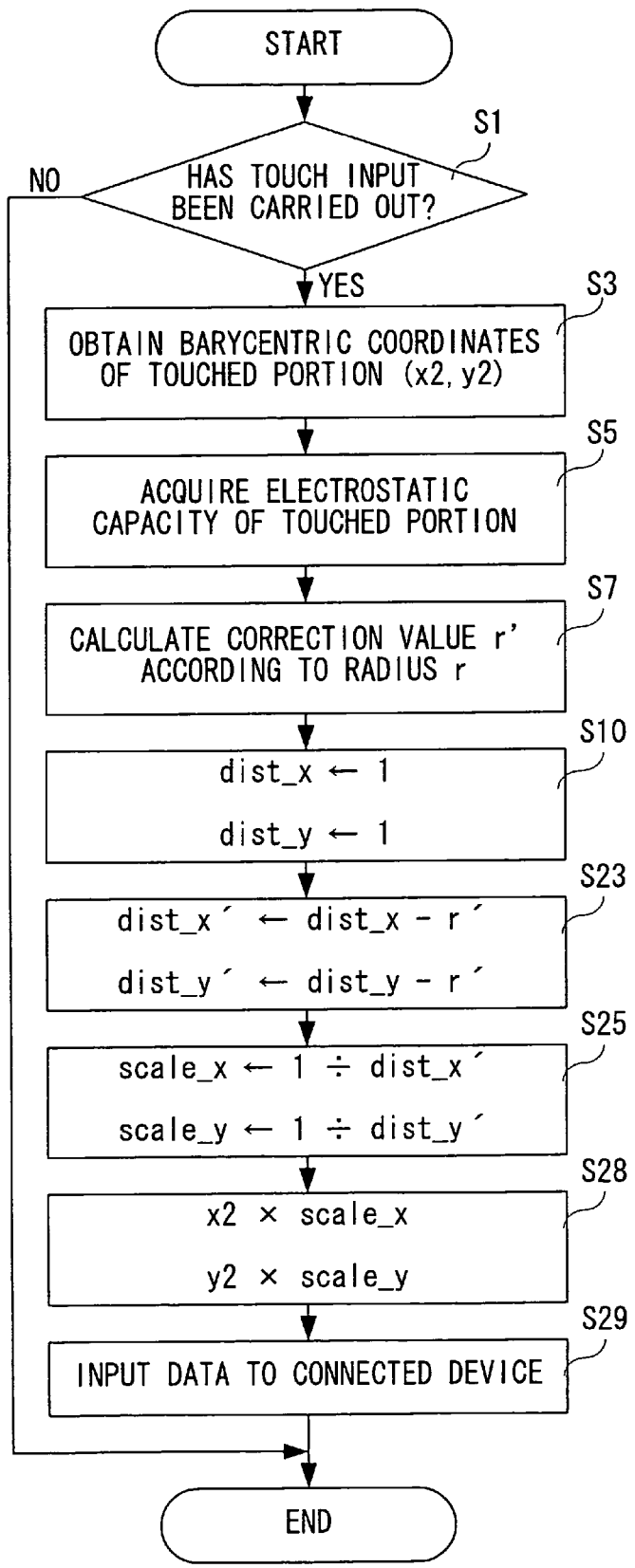
FIG. 9 is a flowchart showing still another example of data input process of the computer shown in FIG. 1.
Figure 10:
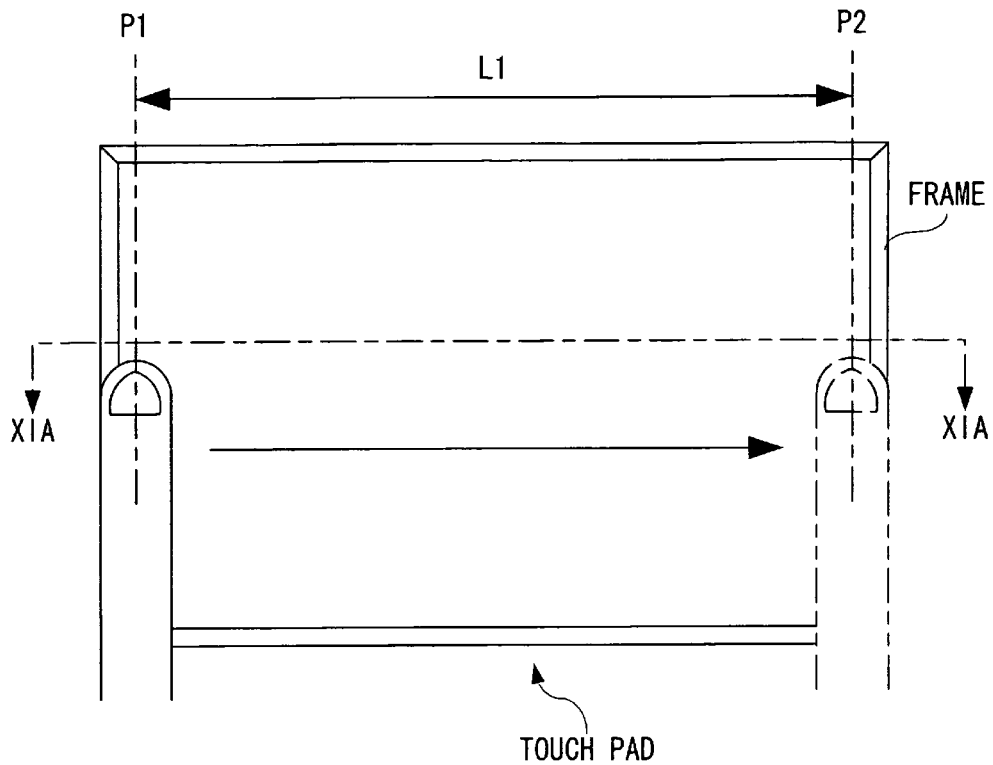
FIG. 10 is a top view of a touch pad as seen by users different in finger thickness when dragging their fingers linearly from left to right on the pad surface.
Figure 10:
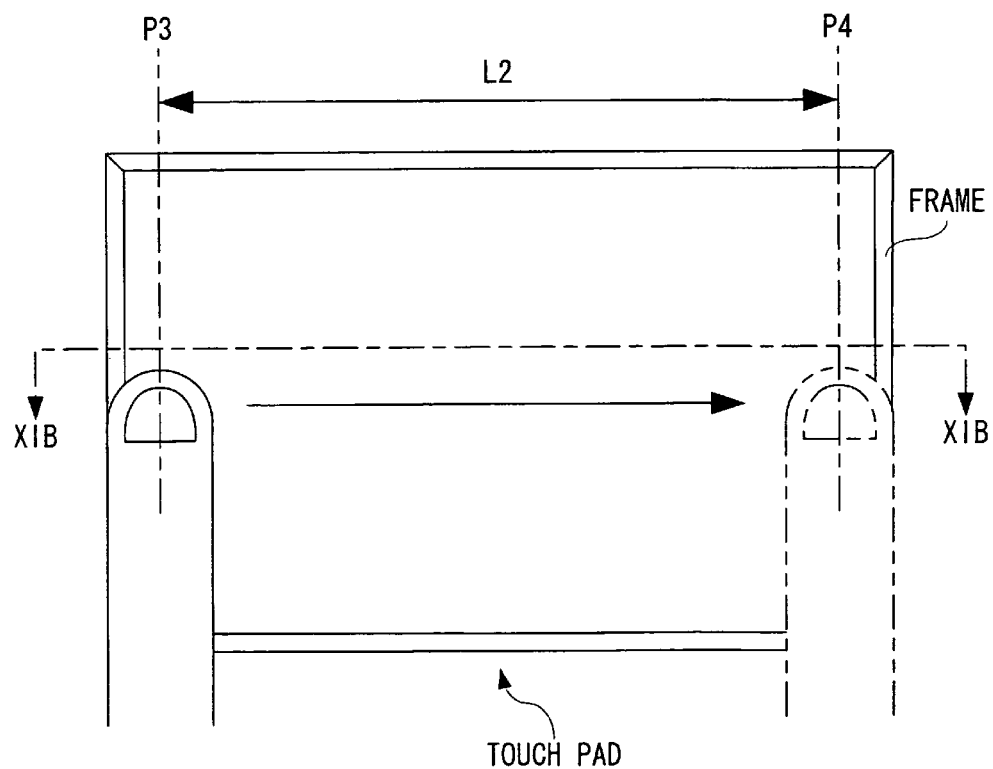
Figure 11:
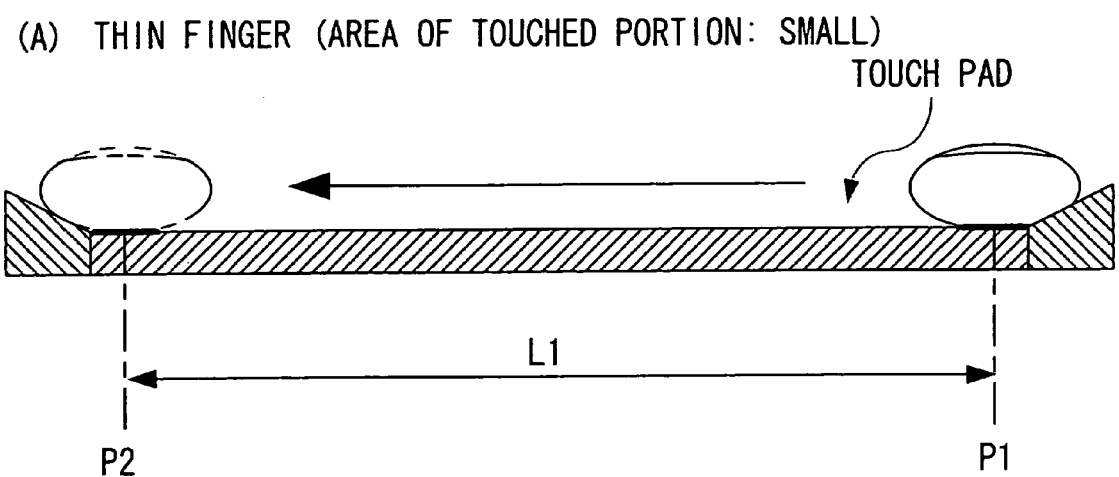
FIG. 11 is a cross-sectional view of FIG. 10.
Figure 11:
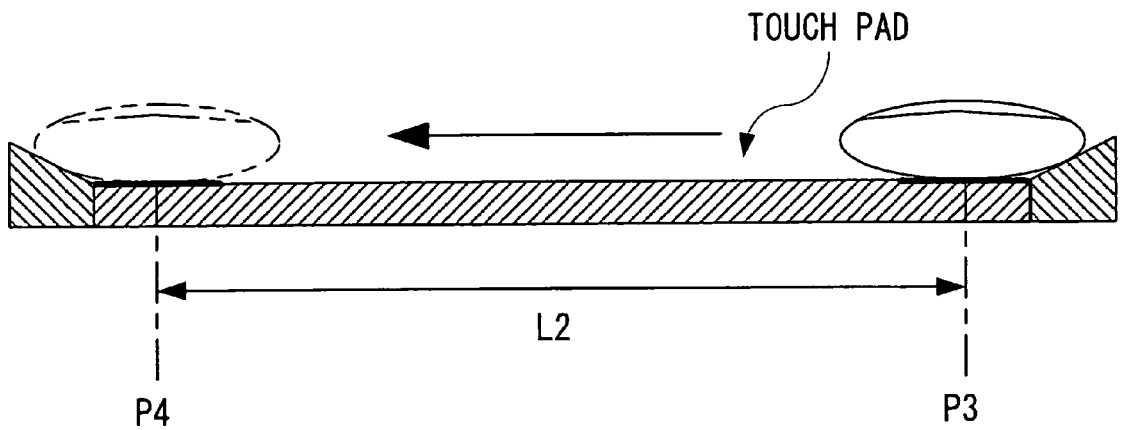
Figure 12:
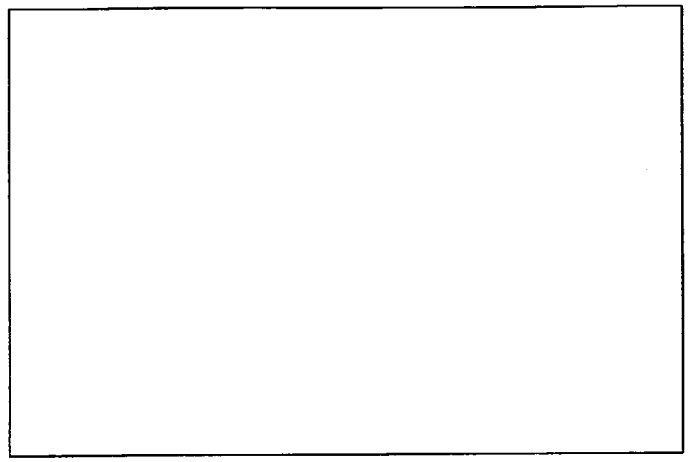
FIG. 12 is an illustrative view showing the whole operating range and actual operable ranges for users different in finger thickness.
Figure 12:
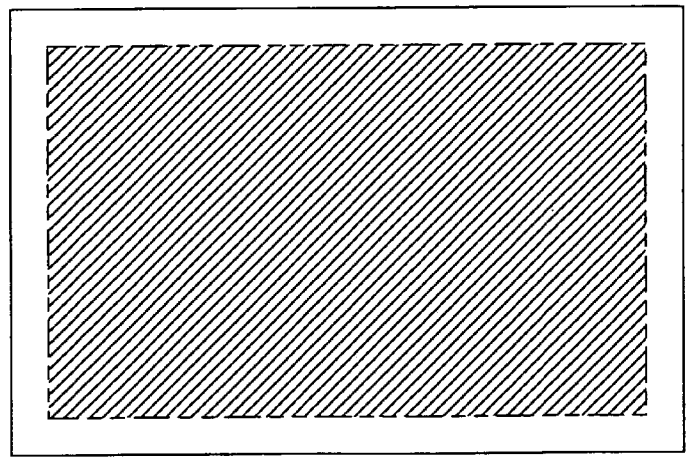
Figure 12:
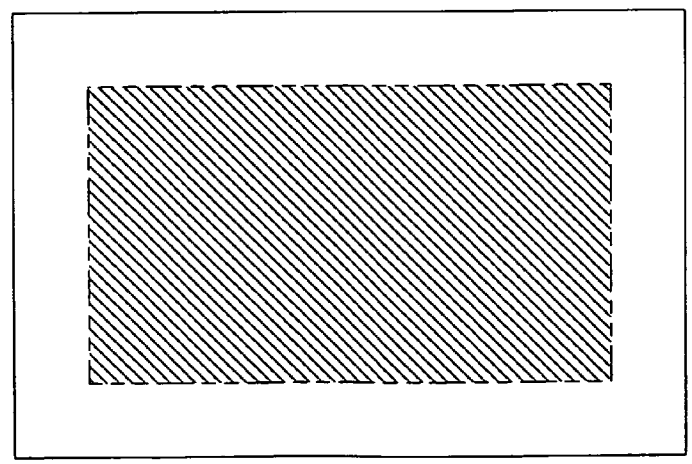

In such a case, the computer 12 executes a data input process according to the flowchart shown in FIG. 9. Since this process is almost the same as the data input process of FIG. 8, the identical steps of the process will be given the same reference numerals (step numbers) and a detailed description of this process will be omitted here.

More specifically, the data input process of FIG. 9 is formulated in such a manner that the step S9 is deleted from the data input process of FIG. 8 and the step S27 in the data input process of FIG. 8 is replaced by a step S28. That is, there is no need to detect the coordinates of the reference point. When the enlargement ratios (scale_x, scale_y) are calculated in a step S25, the current touch coordinates (x2, y2) are corrected in the step S28. Besides, the touch coordinates after the correction (x', y') are calculated according to equation 9.

$$x' = x2 \times scale\_x$$

$$y' = y2 \times scale\_y$$

As descried above, it is possible to input the corrected touch coordinates as input data into the electronic device connected to the computer 12. In such a case, it is also possible to eliminate relative and absolute differences in the operable range, which allows stable input operations.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A storage medium storing an input adjustment program for a flat-type pointing device that has an operating surface and inputs touch coordinates and a value according to a touch area at a moment when a touch operation is performed on the operating surface, wherein said input adjustment program allows a computer to execute:

a correction value calculation which utilizes a value according to the touch area input from said flat-type pointing device as indicating an area of a circle to calculate a correction value according to a radius of the circle where the touch area is assumed to be the circle area;

a first range calculation which calculates a first range capable of being covered by said touch coordinates using the correction value calculated in said correction value calculation;

a scale factor calculation which calculates a scale factor for conforming the first range calculated in said first range calculation to a second range of said whole operating surface; and a distance correction which calculates a distance from a reference point to current touch coordinates by the scale factor calculated in said scale factor calculation.

2. A storage medium storing an input adjustment program for appointing device according to claim 1, wherein said reference point indicates touch coordinates at a moment when the operating surface is touched, and said computer is further allowed to execute a reference point correction which corrects at least one of a deviation in a horizontal direction and a deviation in a vertical direction of said reference point from a central point of said operating surface.

3. A storage medium storing an input adjustment program for a flat-type pointing device that has an operating surface and inputs touch coordinates and a value according to a touch area at a moment when the operating surface is touched, wherein said input adjustment program allows a computer to execute:

a correction value calculation utilizing a touch area input from said flat-type pointing device as indicating an area of a circle to calculate a correction value according to a radius of the circle using the value according to the touch area;

a first range calculation which calculates a first range in which said whole operating surface is reduced toward the center by a distance according to the correction value calculated in said correction value calculation;

a scale factor calculation which calculates an enlarging ratio for conforming the first range calculated in said first range calculation to a second range as said whole operating surface; and a coordinate correction which, by enlarging and correcting the touch coordinates in said first range at the enlargement ratio calculated in said scale factor calculation step, converts the touch coordinates in the first range into touch coordinates in said second range.

4. An input adjustment apparatus for a flat-type pointing device that has an operating surface and inputs touch coordinates and a value according to a touch area at a moment when the operating surface is touched, comprising:

a correction value calculator that utilizes the value according to the touch area input from said flat-type pointing device as indicating an area of a circle to calculate a correction value according to a radius of the circle where the touch area is assumed to be the circle area;

a first range calculator that calculates a first range capable of being covered by said touch coordinates using the correction value calculated by said correction value calculator;

a scale factor calculator that calculates a scale factor for conforming the first range calculated by said first range calculator to a second range as said whole operating surface; and a distance correction programmed logic circuitry for correcting a distance from a reference point to current touch coordinates by the scale factor calculated by said scale factor calculator.

5. An input adjustment apparatus for a flat-type pointing device according to claim 4, wherein said reference point is on touch coordinates at a moment when the operating surface is touched, and further comprising:

a reference point correction programmed logic circuitry for correcting at least one of a deviation in a horizontal direction and a deviation in a vertical direction of said reference point from a central point of said operating surface.

6. An input adjustment apparatus for a flat-type pointing device that has an operating surface and inputs touch coordinates and a value according to a touch area at a moment when the operating surface is touched, comprising:

a correction value calculator which utilizes a touch area input from said flat-type pointing device as indicating an area of a circle to calculate a correction value according to a radius of the circle using the value according to the touch area;

a first range calculator for calculating a first range in which said whole operating surface is reduced toward the center by a distance according to the correction value calculated by said correction value calculator;

a scale factor calculator for calculating an enlargement ratio for conforming the first range calculated by said first range calculator to a second range as said whole operating surface; and a coordinate correction programmed logic circuitry which, by enlarging and correcting the touch coordinates in said first range at the enlargement ratio calculated by said scale factor calculator, converts the touch coordinates in the first range into touch coordinates in said second range.

7. An input adjustment method for a flat-type pointing device that has an operating surface and inputs touch coordinates and a value according to a touch area at a moment when the operating surface is touched, the method comprising:

(a) utilizing a value according to the touch area input from said flat-type pointing device as indicating an area of a circle to calculate a correction value according to a radius of the circle where the touch area is assumed to be the circle area;

(b) calculating a first range capable of being covered by said touch coordinates using the calculated correction value;

(c) calculating a scale factor for conforming the calculated first range to a second range as said whole operating surface; and (d) correcting a distance from a reference point to current touch coordinates by the calculated scale factor.

8. An input adjustment method according to claim 7, wherein said reference point is on touch coordinates at a moment when the operating surface is touched, and further comprising:

(e) correcting at least one of deviation in a horizontal direction and a deviation in a vertical direction of said reference point from a central point of said operating surface.

9. An input adjustment method for a flat-type pointing device that has an operating surface and inputs touch coordinates and a value according to a touch area at a moment when the operating surface is touched, the method comprising:

(a) utilizing a touch area input from said flat-type pointing device as indicating an area of a circle to calculate calculating a correction value according to a radius of the circle using the value according to the touch area;

(b) calculating a first range in which said whole operating surface is reduced toward the center by a distance according to the calculated correction value;

(c) calculating an enlargement ratio for conforming the calculated first range calculated to a second range as said whole operating surface; and (d) by enlarging and correcting the touch coordinates in said first range at the calculated enlargement ratio, converting the touch coordinates in the first range into touch coordinates in said second range.

* * * * *